United States Patent
Kraus et al.

(10) Patent No.: US 9,993,930 B2
(45) Date of Patent: Jun. 12, 2018

(54) ELECTRIC APPLIANCE FOR PERSONAL CARE

(71) Applicant: Braun GmbH, Kronberg (DE)

(72) Inventors: Bernhard Kraus, Braunfels (DE); Thomas Verstege, Frankfurt am Main (DE); Uwe Schober, Glashuetten (DE); Frank Ziegler, Karben (DE)

(73) Assignee: Braun GmbH, Kronberg (DE)

( * ) Notice: Subject to any disclaimer, the term of this patent is extended or adjusted under 35 U.S.C. 154(b) by 253 days.

(21) Appl. No.: 14/970,568

(22) Filed: Dec. 16, 2015

(65) Prior Publication Data
US 2016/0181901 A1    Jun. 23, 2016

(30) Foreign Application Priority Data

Dec. 23, 2014  (EP) .................................... 14200089

(51) Int. Cl.
*H02K 33/12*   (2006.01)
*B26B 19/28*   (2006.01)
(Continued)

(52) U.S. Cl.
CPC ............ *B26B 19/282* (2013.01); *H02K 1/34* (2013.01); *H02K 5/16* (2013.01); *H02K 7/14* (2013.01); *H02K 33/00* (2013.01); *H02K 33/12* (2013.01)

(58) Field of Classification Search
CPC ...... B26B 19/282; B26B 19/284; H02K 1/34; H02K 33/00; H02K 33/12
(Continued)

(56) References Cited

U.S. PATENT DOCUMENTS 3,295,808 A      1/1967 Webb
4,326,138 A *    4/1982 Shtrikman ............. H02K 33/06
                                                        30/48
(Continued)

FOREIGN PATENT DOCUMENTS

DE       10242094         4/2004
DE       102008031134 A1 * 1/2010  ............. H02K 33/04
JP       S5924226         2/1984

OTHER PUBLICATIONS

U.S. Appl. No. 14/970,567, filed Dec. 16, 2015, Martin Ring et al.

*Primary Examiner* — Burton Mullins
(74) *Attorney, Agent, or Firm* — Ronald T. Sia; Kevin C. Johnson; Steven W. Miller

(57) ABSTRACT

The present invention relates to electric appliances for personal care, in particular electric shavers, comprising a magnetic linear drive unit having first and second drive components supported for linear displacement relative to each other and adapted to magnetically interact with each other, wherein a drive support is provided for supporting the drive unit onto a mounting structure. The drive support supporting the drive unit onto a mounting structure of the installation environment is adapted to provide for at least one axis of rotation for the drive unit allowing said drive unit to rotate relative to the mounting structure, said axis of rotation being spaced apart from the drive unit to provide for a transmission ratio increasing or decreasing the oscillation amplitude of the functional element driven by the drive unit vis-à-vis the oscillation amplitude of the drive unit.

12 Claims, 3 Drawing Sheets

(51) Int. Cl.
*H02K 1/34* (2006.01)
*H02K 7/14* (2006.01)
*H02K 33/00* (2006.01)
*H02K 5/16* (2006.01)

(58) Field of Classification Search
USPC .................................................. 310/28, 30
See application file for complete search history.

(56) References Cited

U.S. PATENT DOCUMENTS

| | | |
|---|---|---|
| 5,632,087 A | 5/1997 | Motohashi et al. |
| 6,933,630 B2 | 8/2005 | Kraus et al. |
| 6,991,217 B2 | 1/2006 | Shimizu et al. |
| 7,288,863 B2 | 10/2007 | Kraus |
| 7,841,090 B2 | 11/2010 | Eichhorn |
| 8,806,756 B2 | 8/2014 | Kraus et al. |
| 2009/0025229 A1 | 1/2009 | Kappes et al. |
| 2012/0019079 A1* | 1/2012 | Ziegler ................ A61C 17/222 310/29 |

* cited by examiner

ELECTRIC APPLIANCE FOR PERSONAL CARE

FIELD OF THE INVENTION

The present invention relates to electric appliances for personal care, in particular electric shavers, comprising a magnetic linear drive unit having first and second drive components connected to each other by means of a first spring device for linear displacement relative to each other and adapted to magnetically interact with each other, wherein a drive support is provided for supporting the drive unit onto a mounting structure, said drive support including a second spring device allowing for movements of the drive unit relative to the mounting structure.

BACKGROUND OF THE INVENTION

Small sized electric appliances for personal care often include functional elements or working tools driven by an electric-type, more particularly magnetic-type drive unit which may be received within a housing element that may form a handpiece to be handheld.

For example, electric shavers may have one or more cutter elements driven by an electric drive unit in an oscillating manner where the cutter elements reciprocate under a shear foil, wherein such cutter elements or undercutters may have an elongated shape and may reciprocate along their longitudinal axis. Other types of electric shavers use rotatory cutter elements which may be driven in an oscillating or a continuous manner. The said electric drive may include an electric motor or a magnetic type linear motor, wherein the drive unit may include an elongated drive transmitter for transmitting the driving motion of the motor to the cutter element.

Such drive systems include sometimes linear-type drive units comprising first and second drive components reciprocating or oscillating relative to each other in a substantially linear manner, i.e. substantially along linear axes, wherein the driving forces may result from magnetic fields. For example, one of the drive components may include a permanent magnet, whereas another one of the drive components may include one or more magnetic coils to which pulsating electric current is applied to create pulsating magnetic fields, thereby causing the two drive components to oscillate relative to each other. At least one of the drive components connects to a transmission train transmitting the oscillating movement of the drive component onto the functional element to be driven such as the aforementioned cutter element, wherein such transmission train may include a transmitter pin directly connecting to the cutter element or indirectly connected thereto by means of a yielding bridge structure allowing for pivoting movements of the cutter element.

For example, US 2009/0025229 A1 or U.S. Pat. No. 7,841,090 B2 discloses an electric shaver having a pair of cutter elements provided under a shear foil and driven in an oscillating manner.

Furthermore, WO 03/103905 A1 and EP 0 674 979 A1 disclose linear oscillating drive units for shavers, wherein the drive components oscillating relative to each other in a linear manner include a permanent magnet on the one hand and a magnetic coil on the other hand.

In such systems, one of the drive components may be rigidly connected to a mounting structure or the installation environment which is often a handpiece formed by a housing part of the electric appliance in which the drive unit is received. For example, the permanent magnet may be rigidly supported or fixedly connected to an interior side of the handpiece via a drive carrier or a mounting structure connected thereto, whereas the other drive component including the magnetic coils may be movably supported on said drive carrier for allowing the linear oscillation, for example by means of a pendulum bearing. Due to the fixed connection of one of the drive components to the handpiece, undesired vibrations can be implied onto the handpiece, thereby reducing the handling comfort.

So as to reduce such undesired vibrations onto the handpiece, it already has been suggested to support both drive components displaceable relative to said mounting structure to allow both drive components to execute linear oscillation in a counteracting manner. For example, WO 03/103905 A1 suggests to not fix one of the drive components, but to fix the linkage or pendulum bars linking the two drive components to each other, to the drive carrier and thus, to the installation environment in terms of an inner portion of the handpiece housing. Such fixing of the pendulum bearing to the drive carrier allows both drive units to oscillate in the direction of the oscillation axis in a sort of reverse motion. When a first drive component moves to the left, the other drive component moves to the right, and vice versa. Such reverse oscillation may reduce the aforementioned undesired vibrations of the handpiece.

However, due to tolerances of the drive components and/or phase offset, there still may be mismatch of the dynamic effects of the reverse motions and thus, vibrations that can be felt in the hand holding the handpiece. Such phase offset between the oscillating components of the drive unit may be caused, for example, by frictional effects between the shear foil and the cutter elements. When the components are not oscillating in exact 180° phase opposition, vibrations arise. Moreover, when there are unbalanced or different loads onto the oscillating motor components, for example when there is only one element or component under load, the desired dynamic compensation may no longer be achieved.

Furthermore, due to restrictions of the oscillating amplitude of the drive components and restrictions in the mounting space, the cutter elements at the shaver head sometimes cannot be driven at the desired oscillation amplitude. As the same type of drive unit is sometimes used for different types of shavers to keep manufacturing costs low by means of applying modularity, the oscillation amplitude provided by such common drive unit does not fit all shaver types so the cutter element of a specific shaver type is not driven at the desired oscillation amplitude. Moreover, it is sometimes desired to have higher driving forces at smaller oscillation amplitudes or in the alternative lower driving forces at higher amplitudes, and thus to have a decreasing or increasing transmission ratio.

SUMMARY OF THE INVENTION

It is an objective underlying the present invention to provide for an improved electric appliance for personal care avoiding at least one of the disadvantages of the prior art and/or further developing the existing solutions. A more particular objective underlying the invention is to provide for an improved drive unit structure reducing vibrations onto the installation environment surrounding the drive unit without sacrificing drive efficiency under high oscillation frequencies. A further objective is to allow for easy adaption of the oscillation amplitude of the cutter element of a shaver head and matching the drive unit's oscillation amplitude with a desired oscillation amplitude of the cutter elements of the shaver head. A still further objective is to allow for less restrictive manufacturing tolerances of the drive components without reducing performance characteristics such as stable oscillation frequencies, sufficient amplitudes and low vibrations. Another objective is to avoid complicated mounting structures and to allow for installation of the drive unit into housing elements forming handpieces without requiring additional space or redesigning established ergonomic housings. A further objective is to provide for an increasing or decreasing transmission ratio and thus lower driving forces at higher oscillation amplitudes or higher driving forces at smaller oscillation amplitudes.

To achieve at least one of the aforementioned objectives, the drive support supporting the drive unit onto the mounting structure is adapted to provide for rotatory movements of the drive unit relative to the surrounding mounting structure in addition to the linear oscillation of the drive components relative to each other. Although the drive components, relative to each other, may execute linear displacement in opposite directions, the entire drive unit may execute a rotatory or pivoting oscillation which is transmitted to the functional element such as cutter elements via a transmitter executing a corresponding rotatory and/or pivoting oscillation about an axis substantially perpendicular to the longitudinal axis of the transmitter. In particular, the drive support may define an eccentric pivot axis which pivot axis may be spaced from the center of vibrations caused by the drive components and/or spaced away from the center of gravity of the drive unit and/or spaced away from the center of gravity of the two drive components. Due to such eccentric pivot axis defined by the drive support, the vibrations of the oscillating drive components can be transformed into a rotatory or pivoting oscillation of the drive train system comprising the drive unit, the transmitter and the cutter elements, thereby achieving transformation of the drive components' oscillation amplitude into the cutter elements' oscillation amplitude. Depending on the center point of such pivoting and/or rotatory oscillation, the oscillation amplitude of the drive unit is transformed into a cutter element oscillation amplitude which may vary from the drive unit's oscillation amplitude, wherein the ratio of transmission can be adjusted by means of adjusting the position of the center point of the pivoting and/or rotatory oscillation. The oscillation amplitude of the cutter element may be adjusted to be smaller or larger than the oscillation amplitude of the drive unit.

In addition, due to such additional rotatory degree of freedom allowing the drive components to not only linearly oscillate relative to each other, but together pivot or rotate to some degree, a significant reduction of vibrations onto the installation environment can be achieved. Moreover, vibrations of the drive unit can be kept away from the handpiece. On the one hand, the drive components may oscillate relative to each other along a linear oscillation axis, and, on the other hand, when oscillating relative to each other, the drive components both may rotate or pivot in an oscillating manner about said axis of rotation due to the rotatory freedom of the drive carrier. Torques caused by manufacturing tolerances and/or phase offset between the oscillating drive components are not transferred to the mounting structure of the installation environment, thus allowing for a more comfortable handling of the electric appliance.

These and other advantages become more apparent from the following description giving reference to the drawings and possible examples.

DETAILED DESCRIPTION OF THE INVENTION

Figure 1:
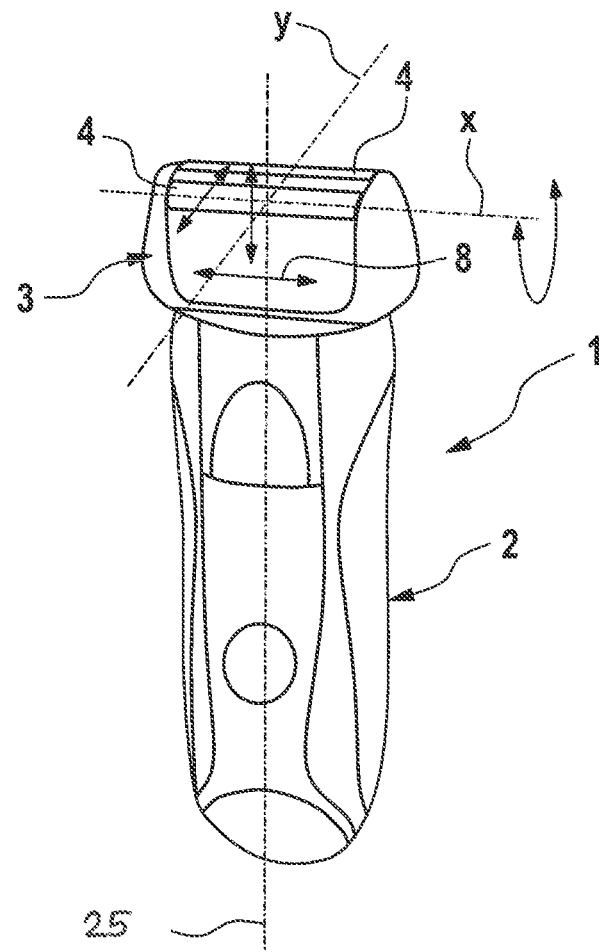
FIG. 1: is a perspective partial view of a small-sized electric appliance for personal care in terms of an electric shaver having a shaver head including two cutter elements drivable in an oscillating manner by a linear type drive unit received within the shaver housing forming the shaver's handpiece.

In order to achieve a transmission ratio between the drive unit's oscillation amplitude and the cutter elements' oscillation amplitude and the driving forces and/or to avoid transfer of rotatory vibrations due to torques generated in the drive unit due to tolerances or phase offset, the drive unit including the drive components is allowed to execute rotatory movements relative to the surrounding mounting structure. More particularly, the drive unit including the drive components and the transmitter connected thereto are allowed to rotate relative to said surrounding mounting structure, wherein said drive components are connected to each other to oscillate relative to each other in a linear way along a substantially linear displacement or oscillation axis. According to an aspect, the drive support supporting the drive unit onto the mounting structure, is adapted to provide for at least one axis of rotation for said drive unit and the transmitter attached thereto to rotate relative to the mounting structure about said at least one axis of rotation in addition to the oscillation of the drive components relative to each other.

Due to such axis of rotation, the drive unit is separated from the surrounding mounting structure in terms of rotatory vibrations and torques.

As such axis of rotation or pivot axis defined by the drive support, is eccentric with regard to the center of vibrations of the drive unit and/or the center of gravity of the drive unit, such vibrations effected by the oscillation of the drive components has a leverage arm relative to said pivot axis, thereby causing a pivoting oscillation of the drive train system including the drive unit, the transmitter and the at least one functional element such as a cutter element connected to the drive unit by means of said transmitter. Due to the eccentric position of such pivot axis spaced away from the aforementioned center of vibrations and/or center of gravity, the oscillation amplitude of the drive components is transformed into an oscillation amplitude of the cutter element that may be different from the oscillation amplitude of the drive components. The ratio of transmission depends on the position of the pivot axis relative to the drive components, so that a cutter element oscillation amplitude smaller than or larger than the oscillation amplitude of the drive components may be achieved.

The drive support and/or the second spring device thereof may be adapted to define the pivot axis to be positioned on a central longitudinal axis of the drive train system and/or the longitudinal axis of the shaver's handpiece and/or the longitudinal axis of the transmitter and/or the longitudinal axis of the drive unit.

In order to achieve a transmission ratio transforming the drive unit's oscillation amplitude into a larger oscillation amplitude of the cutter element, the drive support may be configured to define the pivot axis on a side of the drive unit opposite to the cutter element. Such increase in the oscillation amplitude of the cutter element in comparison to the drive unit's oscillation amplitude can be advantageous to increase cutting speed. In the alternative, the drive support and/or the spring device thereof may be configured to define the pivot axis to be positioned on the side of the drive unit facing the cutter element so as to achieve a transmission ratio where the cutter element oscillation amplitude is smaller than the oscillation amplitude of the drive components. Such decreased cutter element oscillation amplitude may be advantageous when increased cutting forces are desired, since a decreased cutter element oscillation amplitude goes along with an increased cutting force.

The spring device of the drive support connecting the drive unit to the mounting structure, may have different configurations. For example, a pair of helical springs may be provided on each of opposite sides of the drive unit so that each of opposite sides of the drive unit are connected to the respective portion of the mounting structure by a pair of helical springs. Such helical springs may have different spring characteristics and/or spring forces so as to define the pivot axis to be eccentric relative to the center of the drive unit.

In the alternative to such helical spring configuration, the drive support connecting the drive unit to the mounting structure may include a pair of leaf springs being arranged inclined relative to each other, in particular having a V-like arrangement, wherein such leaf springs are positioned on opposite sides of the drive unit so that the drive unit is connected to opposite sides of the mounting structure by means of a leaf spring on each side.

Such leaf springs on opposite sides of the drive unit may be arranged so that longitudinal axes going through the leaf springs in a neutral position of the drive unit with the drive components being inactive, define an acute angle, wherein such acute angle between the longitudinal axes of the leaf springs may range from 2×0.5° to 2×25° or from 2×0.5° to 2×10° or from 2×1° to 2×5°.

The aforementioned leaf springs each may have a connection point to the mounting structure and a connection point to the drive unit, wherein the connection to the mounting structure may be positioned somewhere between the drive unit and the shaver head and the connection point to the drive unit may be positioned somewhere in a region of the drive unit opposite to the shaver head.

In addition or in the alternative, the aforementioned leaf springs may extend along substantially the entire side of the drive unit, wherein each of the leaf springs may extend along at least 50% or even 75% of the drive unit when considering the longitudinal extension thereof measured along the longitudinal axis of the handpiece.

According to a more generalized aspect, the drive support may include a pair of spring elements supporting the drive unit relative to the mounting structure, wherein said pair of spring elements may define a four point joint supporting the drive carrier rotatable about said axis of rotation. The spring elements may form a spring bar linkage allowing rotatory movements of the respective component of the drive support to which the spring bar linkage is connected, wherein the spring bar linkage may elastically deform to allow such rotatory movement. More particularly, the aforementioned spring elements may bend and/or yield and/or be tensioned and/or be compressed, thus allowing rotatory movement of the component of the drive unit to which the spring elements are connected.

More particularly, the aforementioned four point joint defined by said pair of spring elements may have two points fixed with the mounting structure and two other points fixed with a structural element of the drive unit, wherein the two points fixed with the drive unit may move relative to the mounting structure due to elastic deformation of the spring elements, thus allowing for rotatory movement of the drive unit relative to the surrounding mounting structure which may be the handpiece of the appliance.

The aforementioned center of rotational vibrations may be in a region somewhere between the first and second drive components, wherein the exact position of such center of rotational vibrations may depend on several factors such as the weight of each of the drive components, the rigidity of the supporting elements supporting the drive components for linear oscillation and the kinematics defined by the support elements allowing for linear oscillation. Such center of rotatory vibrations may be determined, for example, by testing and/or by calculation methods such as finite element methods.

According to an aspect, the drive support may provide for multiaxial rotatory degree of freedom so that the drive unit and/or at least the active drive component thereof may rotate about a plurality of axes of rotation.

According to an aspect, the at least one axis of rotation may extend transverse to the oscillation axis of the drive unit and/or transverse to a longitudinal axis of a handpiece of the electric appliance. More particularly, the axis of rotation may extend substantially perpendicular to a plane defined by the oscillation axis of the drive components and a virtual line connecting the drive unit with the functional element to be driven and/or substantially perpendicular to a plane defined by the oscillation axis of the active drive component of the drive unit and the oscillation axis of the functional element to be driven, for example the cutter element of a shaver oscillating transverse to the shaver's longitudinal axis.

The aforementioned rotatory degree of freedom provided by the drive support may be provided for both drive components oscillating relative to each other. Such degree of freedom for both first and second drive components may help in avoiding angular mismatch of the two components with each other so that it becomes possible to provide for only very small gaps between the first and second drive components, thereby increasing efficiency.

Said first and second drive components may be movably supported in different manners so as to allow for linear oscillation relative to each other. For example, the first and second drive components may be supported separately and/or independently from each other onto a drive carrier structure. In the alternative, the first and second drive components may be connected to each other for example by means of a pendulum bearing or a four point bearing allowing for linear oscillation of the drive components relative to each other. For example, a pair of pivot bars or leaf springs may connect the first drive component to the second drive component such that said first and second drive components may oscillate relative to each other along an oscillation axis, wherein the pivot bars or leaf springs may pivot and/or bend to allow such relative oscillation. In particular, said pendulum bearing may be configured in terms of a parallelogram support allowing the drive components to oscillate due to twisting and/or rotating of the pendulum legs.

The drive support of the drive components onto the surrounding structure may include a pendulum bearing or a four point bearing supporting one of the drive components on the drive carrier. When the first and second drive components are connected to each other by means of a parallelogram linkage or the leaf springs as described above, the pendulum bearing may also support such parallelogram linkage or leaf springs on the drive carrier in a movable way, thereby supporting the drive components relative to the drive carrier in a sort of indirect way, namely by means of a first pendulum bearing supporting the drive components relative to each other and a second pendulum bearing supporting the first pendulum bearing relative to the drive carrier. Such first and second pendulum bearings may be formed by the aforementioned first and second spring devices or formed separately therefrom.

In particular, a pair of leaf springs may be provided for supporting one of the drive components—or the parallelogram legs or pendulum bearing connecting the drive components to each other—onto the drive carrier. Such leaf springs may extend on opposite sides of the drive components with longitudinal axis of the leaf springs extending inclined to each other, wherein each of said leaf springs may have a connection point making connection to the drive carrier on one side of the drive components and a second point of connection making connection to the drive component on the opposite side of the drive carrier portion to which the leaf springs are connected. In other words, the leaf springs may form a sort of bridge extending over the drive component to which the leaf springs are not connected.

The aforementioned mounting structure of the installation environment may be a mounting frame received within a housing and/or held in a fixed position within a handpiece of the electric appliance. In the alternative, the mounting structure may be formed directly by an inner surface of a housing element or the handpiece.

In order to dampen rotatory movement of the drive unit about said additional rotatory degree of freedom, the drive support may include a damper dissipating rotatory energy of the drive unit and retarding movements of the drive unit about said at least one axis of rotation.

The electric appliance for personal care may be an electric shaver including a handpiece formed by a shaver housing and a shaver head pivotably supported onto said handpiece about one or more pivot axes allowing for self-adaption of the shaver head to the contour of the skin to be shaved.

The shaver head may include only one cutter element, but the shaver head also may include two, three or more cutter elements. The shaver head may include further cutting or non-cutting functional elements such as a thermal element for cooling or heating a skin portion to be shaved, or a long-hair cutter, or fluid applicators to apply fluids such as deodorants, balms or lubricants onto the skin.

The transmission train for transmitting the drive power and movements of the electric linear motor to the at least one cutter element may have varying architectures and structures depending on the type of motor and the arrangement thereof. For example, the drive unit may include a reciprocating pin coupled to the aforementioned cutter element or undercutter directly or via an oscillation bridge allowing for pivoting of the cutter element relative to the angular orientation of the longitudinal axis of said pin.

These and other features become more apparent from the example shown in the drawings. As can be seen from FIG. 1, shaver 1 may have a shaver housing 2 forming a handpiece for holding the shaver, which shaver housing 2 may have different shapes such as—roughly speaking—a substantially cylindrical shape or box shape or bone shape allowing for ergonomically grabbing and holding the shaver, wherein such shaver housing has a longitudinal shaver housing axis 25 due to the elongated shape of such housing, cf. FIG. 1.

On one end of the shaver housing 2, a shaver head 3 is attached to the shaver housing 2, wherein the shaver head 3 can be pivotably supported about a shaver head pivot axis x extending substantially perpendicular to the aforementioned longitudinal shaver housing axis. The shaver housing 2 may have a pair of support arms projecting from the shaver head end of the shaver housing 2 between which support arms a carrier structure of the shaver head 3, for example in terms of a shaver head frame, can be pivotably mounted about said shaver head pivot axis x.

As can be seen from FIG. 1, the shaver head 3 may include a pair of cutter elements 4, wherein only one or three or more of such cutter elements 4 may be provided. Such cutter elements 4 may form block-like undercutters with a plurality of shearing blades cooperating with a shear foil covering the respective cutter elements 4. The said cutter elements 4 may have an elongated shape with a longitudinal axis extending substantially parallel to the aforementioned shaver head pivot axis and/or substantially parallel to the cutting oscillation axis 8 along which the cutter elements 4 are driven in an oscillating manner.

Figure 2:
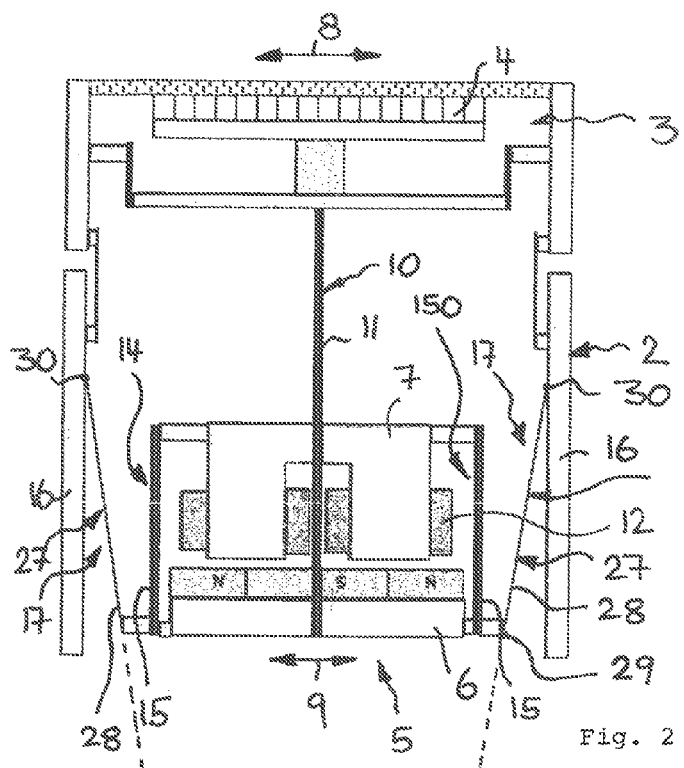
FIG. 2: is a plane view of a drive unit including magnetic-type drive components supported for linear oscillation and the surrounding mounting structure, wherein the drive support connecting the drive unit to the mounting structure, said drive support including leaf springs connecting the drive unit to the surrounding mounting structure, is shown to provide for a rotatory degree of freedom for the drive unit relative to the surrounding mounting structure with an eccentric pivot axis.

As can be seen from FIG. 2, the drive unit 5 which may be received within the shaver housing 2 to drive the cutter elements 4 at the shaver head 3, is of the linear oscillating type and may include a first drive component 6 and a second drive component 7 which may oscillate relative to each other along an oscillation axis 9. Said first drive component 6 may form the active drive component coupled to the aforementioned cutter elements 4 by means of a transmitter 10 which may include a transmitter pin 11 extending from the drive unit 5 towards the shaver head 3. Such transmitter pin 11 may be directly coupled to the cutter elements 4, for example by means of a pivot bearing allowing for an additional transverse degree of freedom to compensate for pivoting of the shaver head 3. In the alternative, the transmitter 10 may include further transmission components such as a transmission bridge as it is per se known in the art.

As shown by FIG. 2, said second drive component 7 may include one or more oscillating, magnetic coils 12, whereas the first drive component 6 may include one or more permanent magnets, wherein, however, an opposite arrangement may be chosen with the coils 12 associated with the first drive component 6 and the permanent magnets associated with the second drive component 7. The drive unit 5 further may include one or more resonance springs arranged between the first and second drive components 6 and 7 to promote oscillation of the first and second drive components 6 and 7 relative to each other at natural frequency.

As can be seen from FIG. 2, the first and second drive components 6 and 7 may be connected to each other by means of a pendulum bearing 14 which may include a four point linkage formed by pendulum bars 15, cf. FIG. 2. Such pendulum bars 15 may have some elasticity or may be formed by leaf springs that may bend, thus allowing relative movement of the drive components. In addition or in the alternative, said pendulum bars 15 may connect to the first and second drive components 6 and 7 at pivot joints allowing for pivoting of the pendulum bars 15 relative to the drive components 6 and 7, wherein such pivot joints may include rubber bearings or other elastic bearing means to provide for some elasticity to allow elastic pivoting of the pendulum bars 15 which may be rigid in such case or also elastic. In other words, the pendulum bars 15 may bend and/or pivot to allow linear oscillation of the drive components 6 and 7 relative to each other. Thus, both drive components 6 and 7 may execute linear oscillation, wherein such oscillation is effected in a sort of reverse motion. When the first drive component 6 moves to the left, the second drive component 7 moves to the right and vice versa.

The drive unit 5 is supported onto a mounting structure 16 by means of a drive support 17. Said mounting structure 16 may be a frame structure surrounding the drive unit 5, wherein such mounting frame may form a closed ring or rectangle surrounding the drive unit 5. Said mounting structure 16 may be rigidly fixed to the shaver housing 2, for example by means of mounting flanges, or may be held in the shaver housing 2 in a fixed position by means of suitable fixation means such as screws or latching means. Said mounting structure also may be formed directly by the shaver housing 2.

To support the drive components 6 and 7 onto the surrounding mounting structure, the drive support 17 may include a further pendulum bearing 27 which links one of the drive components 6 to the mounting structure. More particularly, such further pendulum bearing 27 may include a further pair of leaf springs 28 which may extend substantially perpendicular to each other on opposite sides of the drive unit, said leaf springs 28 each having a connection point 29 to the first drive component 6 and a connection point 30 to the mounting structure 16. Such second set of leaf springs 28 forms a sort of bridge extending from the first drive component 6 on one side of the second drive component 7 to the mounting structure 16 on the opposite side of the second drive component 7, thereby bridging the second drive component 7. Such further pendulum bearing 27 basically may have a configuration similar to the abovementioned other pendulum bearing 14. In particular, it may include rigid pendulum bars elastically supported at the connection points 29 and 30 by means of elastic pivot joints such as rubber bearings or other elastic bearing means to provide for some elasticity to allow elastic pivoting of the pendulum bars. Such elastic pivot joint also could be provided when using leaf springs 28 as pendulum linkage.

Said pendulum bearing 27 and/or said pair of leaf springs 28 may form a four point linkage allowing for a substantially pivoting oscillation of the drive unit 5 about an axis of rotation 22, cf. FIG. 2.

Nevertheless it should be mentioned that supporting the drive components 6 and 7 onto the mounting structure 16 by means of the pendulum bearing configuration as described, is just one possible embodiment. Other types of support are possible.

Figure 3:
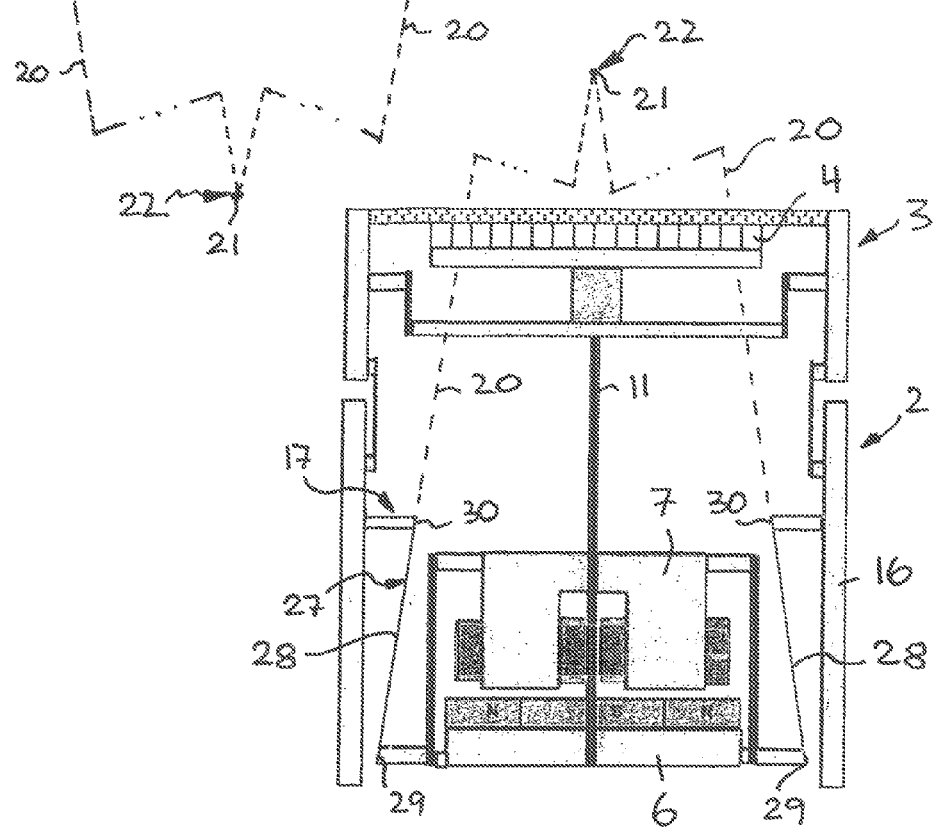
FIG. 3: is a plane view of a drive unit similar to FIG. 2, wherein, in comparison to FIG. 2, the leaf springs of the drive support are arranged at an opposite inclination to define an eccentric pivot axis for the drive unit on an opposite side thereof.
Figure 4:
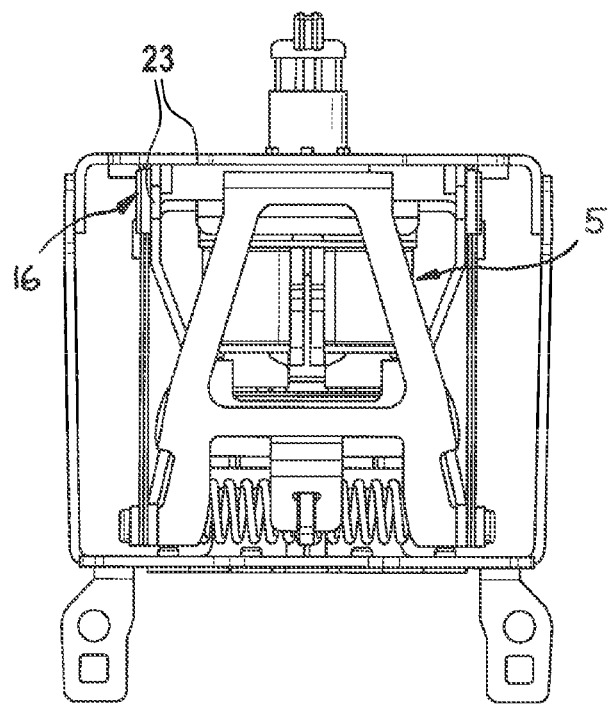
FIG. 4: a plane view of a prior art drive unit of the linear oscillation type where the drive unit is rigidly fixed to the surrounding mounting structure.
Figure 5:
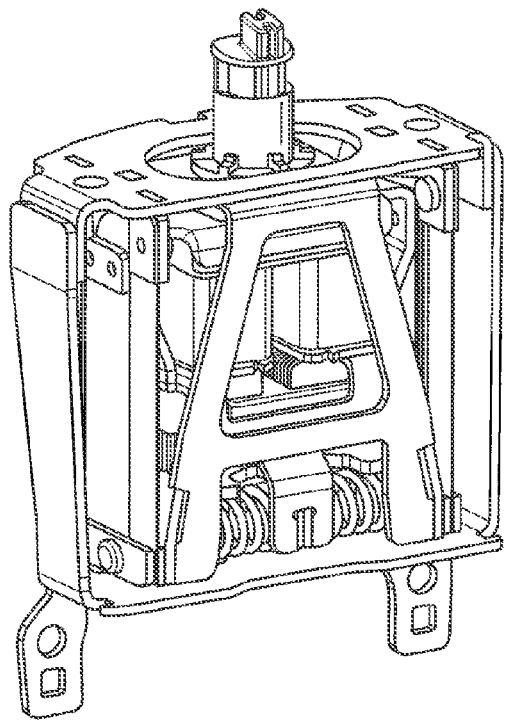
FIG. 5: a perspective view of the drive unit of FIG. 4.

As shown by FIGS. 2 and 3, said leaf springs 28 of the drive support 17 may extend at an acute angle so that longitudinal axes indicated by dashed line 20 of said leaf springs 28, more particularly of a central portion of said leaf springs 28 have a virtual intersection point 21 which is positioned outside a center region of the drive unit 5. The position and angular orientation of the leaf springs 28 may be adapted such that the aforementioned intersection point 21 is positioned at least neighboring a longitudinal center line of the drive unit 5 and/or of the entire drive train including transmitter pin 11 when the drive unit 5 is in their rotary home position, i.e. the neutral position held by the leaf springs 28 of drive support 17 with the drive components 6 and 7 being inactive.

More particularly, the drive support 17 and/or the leaf springs 28 thereof are adapted such that the axis of rotation 22 about which the drive unit 5 may rotate relative to the mounting structure 16, is eccentric to and spaced apart from the center of possible rotatory vibrations of the drive unit 5.

Due to bending of the leaf springs 28, the drive unit 5 basically may execute multiaxial pivoting or rotating. The drive support 17, however, provides for axis of rotation 22, wherein such at least one axis of rotation 22 may extend in a direction transverse to the oscillation axis 9 of the drive unit 5 and/or transverse to the longitudinal axis 25 of the housing 2 or handpiece of the shaver 1. Referring to FIGS. 2 and 3, said axis of rotation 22 may extend perpendicular to the drawing plane.

Depending on the inclination of the leaf springs 28, the virtual intersection point 21 can be positioned on different sides of the drive unit 5 at various points substantially along the longitudinal axis 25 of the handpiece or shaver housing 2. As can be seen from FIG. 2, the leaf springs 28 may be arranged at a V-configuration with an acute angle ranging from 2×0.5° to 2×10°, for example, wherein the orientation of such V-configuration may be chosen so as to have the intersection point 21 on a side of the drive unit 5 opposite to the shaver head 3. Such configuration provides for a transmission ratio increasing the oscillation amplitude of the cutter elements 4 vis-à-vis the oscillation amplitude of the drive components 6 and 7.

On the other hand, as shown by FIG. 3, the orientation of the V-arrangement of the leaf springs 28, may be chosen so as to have the intersection point 21 on the side of the drive unit 5 facing the shaver head 3, wherein the intersection point 21 may be positioned beyond the shaver head 3, i.e. the shaver head 3 is between the intersection point 21 and the drive unit 5, cf. FIG. 3. Such configuration may achieve a transmission ratio decreasing the oscillation amplitude of the cutter element 4 vis-à-vis the oscillation amplitude of the drive unit 5, but increasing the driving force at the cutter element 4.

Due to bending and/or displacement of the leaf springs 28 and/or pendulum bearing 27, the exact position of the intersection point 21 may vary and axis of rotation may move.

In contrast to FIGS. 2 and 3, FIGS. 4 and 5 show a conventional drive unit structure where the drive unit 5 as such is basically similar to the drive unit 5 of FIGS. 2 and 3, wherein, however, the drive carrier supporting the drive components for oscillation of the two drive components relative to each other, is rigidly fixed to the mounting structure 16. Reference numeral 23 designates such rigid connection in FIG. 4.

The shaver head 3 may include further functional elements such as a long-hair cutter which may be arranged between the aforementioned pair of cutter elements 4.

The cutter elements 4 can be driven in an oscillating manner along cutting oscillation axis 8. In addition to such cutting movements, the cutting elements 4 can be pivotable and movable in directions transverse to said cutting oscillation axis 8.

In the context of the present application, the indefinite article "a/an" shall have the meaning "at least one/or more"

if not specified contrarily. Furthermore, geometrical definitions such as "perpendicular to" or "parallel with" shall be understood as "at least substantially perpendicular to" or "at least substantially parallel with" to include the exact mathematical meaning, but not being restricted to. Still further, dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. An electric appliance for personal care, in particular electric shaver, comprising a magnetic linear drive unit having first and second drive components connected to each other by a first spring device for linear oscillation relative to each other and adapted to magnetically interact with each other, wherein a drive support including a second spring device is provided for movably supporting the drive unit onto a mounting structure, wherein said drive support provides for an axis of rotation for the drive unit relative to the mounting structure, thereby allowing said drive components to rotate relative to the mounting structure, said axis of rotation being spaced apart from a center of vibration of the drive components and/or center of gravity of the drive unit,
wherein the second spring device of said drive support includes a pair of spring elements supporting said drive unit relative to said mounting structure, said pair of spring elements defining a four point joint supporting said drive unit rotatable about said at least one axis of rotation,
wherein said four point joint includes two connection points fixed with the mounting structure and two connection points fixed with the drive unit
wherein said two mounting structure connection points are separated by a first distance, wherein said two drive unit connection points are separated by a second distance, wherein said first distance is different from said second distance.

2. The electric appliance according to claim 1, wherein said pair of spring elements includes leaf springs on opposite sides of the drive unit arranged with an inclination relative to each other and arranged to define, with their longitudinal axes, a virtual intersection point outside a center region of the drive unit.

3. The electric appliance according to claim 2, wherein said leaf springs are arranged, in a neutral position of the drive unit with the drive components being inactive, to define an angle of inclination between the leaf springs ranging from 2×1° to 2×10°.

4. The electric appliance according to claim 2, wherein said leaf springs are arranged in a V-configuration where the virtual intersection point is positioned on a side of the drive unit opposite to the functional element of the electric appliance driven by said drive unit.

5. The electric appliance according to claim 2, wherein the leaf springs are arranged in a V-configuration where the virtual intersection point is arranged on a side of the drive unit facing the functional element of the electric appliance driven by the drive unit.

6. The electric appliance according to claim 1, wherein at least one of the drive support and the second spring device of said drive support is configured to provide for a transmission ratio increasing or decreasing an oscillation amplitude of the functional element of the electric appliance driven by the drive unit based on the oscillation amplitude of said drive unit.

7. The electric appliance according to claim 1, wherein the drive support is adapted to provide for said at least one axis of rotation extending transverse to the oscillation axis of the drive unit and/or transverse to a longitudinal axis of a handpiece of the electric appliance.

8. The electric appliance according to claim 1, wherein said first and second drive components are connected to each other by means of a pendulum bearing or a four point bearing allowing for linear oscillation of said first and second drive components relative to each other.

9. The electric appliance according to claim 8, wherein said pendulum bearing is formed by said first spring device.

10. The electric appliance according to claim 1, wherein at least one of said first and second drive components is connected to the mounting structure by means of a pendulum bearing or a four point bearing for linear oscillation of said at least one drive component relative to said mounting structure along said linear oscillation axis.

11. The electric appliance according to claim 10, wherein said pendulum bearing is formed by the second spring device.

12. The electric appliance according to claim 11, wherein said drive support includes a damper for dampening movements of the drive carrier and the drive components supported thereon about said at least one axis of rotation.

* * * * *